United States Patent
Miyazawa

(10) Patent No.: US 8,026,029 B2
(45) Date of Patent: Sep. 27, 2011

(54) METHOD OF MANUFACTURING CHARGED PARTICLE, CHARGED PARTICLE, ELECTROPHORETIC DISPERSION LIQUID, ELECTROPHORETIC SHEET, ELECTROPHORETIC DEVICE AND ELECTRONIC EQUIPMENT

(75) Inventor: Takashi Miyazawa, Hokuto (JP)

(73) Assignee: Seiko Epson Corporation, Tokyo (JP)

( * ) Notice: Subject to any disclaimer, the term of this patent is extended or adjusted under 35 U.S.C. 154(b) by 635 days.

(21) Appl. No.: 11/675,404

(22) Filed: Feb. 15, 2007

(65) Prior Publication Data

US 2007/0195402 A1 Aug. 23, 2007

(30) Foreign Application Priority Data

Feb. 21, 2006 (JP) .................. 2006-044479

(51) Int. Cl.
*G03G 9/16* (2006.01)
(52) U.S. Cl. ................. 430/104; 430/110.2; 430/111.32
(58) Field of Classification Search .................. 430/104, 430/110.2, 111.32
See application file for complete search history.

(56) References Cited

U.S. PATENT DOCUMENTS

| | | | | | |
|---|---|---|---|---|---|
| 3,884,871 | A | * | 5/1975 | Herman et al. | 523/202 |
| 4,981,882 | A | * | 1/1991 | Smith et al. | 523/205 |
| 5,424,129 | A | * | 6/1995 | Lewis et al. | 428/403 |
| 5,750,258 | A | * | 5/1998 | Sakai et al. | 428/405 |
| 7,252,883 | B2 | * | 8/2007 | Wakiya et al. | 428/403 |
| 7,595,108 | B2 | * | 9/2009 | Perez et al. | 428/403 |
| 2002/0149656 | A1 | * | 10/2002 | Nohr et al. | 347/95 |
| 2002/0185378 | A1 | * | 12/2002 | Honeyman et al. | 204/601 |
| 2003/0059702 | A1 | * | 3/2003 | Moffat et al. | 430/120 |
| 2005/0009002 | A1 | * | 1/2005 | Chen et al. | 435/4 |
| 2005/0018273 | A1 | | 1/2005 | Honeyman et al. | |
| 2005/0197462 | A1 | * | 9/2005 | Wang et al. | 525/313 |
| 2006/0131542 | A1 | * | 6/2006 | Weng et al. | 252/301.16 |
| 2010/0003522 | A1 | * | 1/2010 | Zhong et al. | 428/407 |

FOREIGN PATENT DOCUMENTS

| | | |
|---|---|---|
| JP | A 2003-66494 | 3/2003 |
| JP | A-2004-526210 | 8/2004 |
| WO | WO 02/093246 A1 | 11/2002 |
| WO | 2004/053490 * | 6/2004 |

* cited by examiner

*Primary Examiner* — Hoa Le
(74) *Attorney, Agent, or Firm* — Oliff & Berridge, PLC

(57) ABSTRACT

A method of manufacturing a charged particle, comprising: a) providing a mother particle; and b) forming a coating layer that covers at least a part of a surface of the mother particle, wherein the step b) includes: coupling a first chemical compound having at least a part where is going to be a starting point of living polymerization to the surface of the mother particle; and polymerizing a second chemical compound having an ionic group or a functional group convertible to an ionic group so as to form a polymer through the living polymerization that starts from the starting point of the first chemical compound.

10 Claims, 15 Drawing Sheets

METHOD OF MANUFACTURING CHARGED PARTICLE, CHARGED PARTICLE, ELECTROPHORETIC DISPERSION LIQUID, ELECTROPHORETIC SHEET, ELECTROPHORETIC DEVICE AND ELECTRONIC EQUIPMENT

BACKGROUND OF THE INVENTION

1. Technical Field

Several aspects of the present invention relate to a method of manufacturing an electrically charged particle, an electrically charged particle, electrophoretic dispersion liquid, an electrophoretic sheet, an electrophoretic device and electronic equipment.

2. Related Art

It has been generally known that particles move (migrate) in fluid by coulomb force when an electric filed is applied to a dispersion system in which the particles are dispersed in the fluid, and this phenomenon is called electrophoresis. An electrophoretic display device which utilizes the electrophoresis to display desired information (image) has recently attracted attention as a new display device.

The electrophoretic display device has features of a display memory property where a voltage is not applied, a wide viewing angle, a high-contrast display at low power consumption, and so on.

In addition, the electrophoretic display device has another feature that it has a lower impact on viewer's eyes compared to light emitting display devices including a cathode-ray tube display because the electrophoretic display is a non-light emitting device.

As one type of the electrophoretic display device, a micro-capsule type electrophoretic display device has been known. JP-A-2003-66494 is an example of related art. The example discloses an example of the micro-capsule type electrophoretic display device that has a pair of substrates having electrodes, a plurality of microcapsules in which electrophoretic particles and a liquid dispersion medium are enclosed, and binder members that fix the microcapsules onto each substrate.

In the electrophoretic display device disclosed in the example, organic or inorganic particles and particles to which a charge control agent (CCA) is added are used as the electrophoretic particles. However, it is difficult to obtain electrophoretic particles with sufficiently large electric charge and they are not sensitive enough to an electric field. Accordingly, a relatively large electric field is required to move the electrophoretic particles effectively and this results in a large power consumption of the electrophoretic display device.

SUMMARY

An advantage of the present invention is to provide a method of manufacturing a charged particle with which the amount of electric charge of the particle can be controlled, and a charged particle whose sensitivity to an electric field is controllable. Another advantage of the present invention is to provide electrophoretic dispersion liquid, an electrophoretic display sheet, an electrophoretic device and electronic equipment that are reliable since they use such charged particles.

A method of manufacturing a charged particle according to the first aspect of the invention, includes: a) providing a mother particle; and b) forming a coating layer that covers at least a part of a surface of the mother particle. The step b) includes: coupling a first chemical compound having at least a part where is going to be a starting point of living polymerization to the surface of the mother particle; and polymerizing a second chemical compound having an ionic group or a functional group convertible to an ionic group so as to form a polymer through the living polymerization that starts from the starting point of the first chemical compound.

According to the first aspect of the invention, it is possible to control the amount of the electric charge of the particle.

A method of manufacturing a charged particle according to the second aspect of the invention, includes: a) providing a mother particle; and b) forming a coating layer that covers at least a part of a surface of the mother particle. The step b) includes: coupling a first chemical compound having at least a part where is going to be a starting point of living polymerization to the surface of the mother particle; polymerizing a second chemical compound so as to form a polymer through the living polymerization that starts from the starting point of the first chemical compound; and converting at least a part of the polymer to an ionic group.

According to the second aspect of the invention, it is possible to control the amount of the electric charge of the particle.

A method of manufacturing a charged particle according to a third aspect of the invention includes: a) providing a mother particle; and b) forming a coating layer that covers at least a part of a surface of the mother particle. The step b) includes: coupling a first chemical compound having at least a part where is going to be a starting point of living polymerization to the surface of the mother particle; polymerizing a second chemical compound so as to form a polymer through the living polymerization that starts from the starting point of the first chemical compound; either converting at least a part of the polymer to an ionic precursor group that is convertible to an ionic group or introducing an ionic precursor group into the polymer; and converting the ionic precursor group to an ionic group.

According to the third aspect of the invention, it is possible to control the amount of the electric charge of the particle.

In the above-mentioned method, it is preferable that the second chemical compound have a chromophore. In this way, the charged particle can be colored with a desired color.

It is also preferable that a catalyst mainly made of a transition metal halide be used in the living polymerization because such catalyst is appropriate for the living polymerization.

A charged particle according to a fourth aspect of the invention includes a mother particle and a coating layer covering at least a part of the mother particle, the coating layer including a polymer whose one end of a main chain is coupled to a surface of the mother particle, and the polymer having ionic groups at its side chains ramified from the main chain.

According to the fourth aspect of the invention, it is possible to obtain the charged particle whose sensitivity to an electric field is controlled.

A charged particle according to a fifth aspect of the invention includes a mother particle and a coating layer covering at least a part of the mother particle, the coating layer including a polymer whose one end of a main chain is coupled to a surface of the mother particle, and the polymer having at least one chromophore and an ionic group at the other end of the main chain.

According to the fifth aspect of the invention, it is possible to obtain the charged particle whose sensitivity to an electric field is controlled.

In this case, it is preferable that the polymer have the chromophore at its side chain ramified from the main chain. In this way, the charged particle can be colored because the polymer includes the chromophore. The chromophore can be for example ones having more than one conjugated double bond or d-electron such as transition metals. The chromophore includes not only the ones simply color something but also ones that emit light whose wave length is longer than that of blue color.

Electrophoretic dispersion liquid according to a sixth aspect of the invention includes a liquid and the above-described charged particle that is dispersed in the liquid and the charged particle migrating where an electric field is applied.

According to the sixth aspect of the invention, it is possible to obtain a reliable electrophoretic dispersion liquid.

An electrophoretic sheet according to a seventh aspect of the invention includes a substrate and a plurality of structures that enclose the above-mentioned electrophoretic dispersion liquid.

According to the seventh aspect of the invention, it is possible to obtain a reliable electrophoretic sheet.

An electrophoretic device according to an eighth aspect of the invention includes the above mentioned electrophoretic sheet.

According to the eighth aspect of the invention, it is possible to obtain a reliable electrophoretic device.

Electronic equipment according to a ninth aspect of the invention includes the above mentioned electrophoretic device.

According to the ninth aspect of the invention, it is possible to obtain reliable electronic equipment.

BRIEF DESCRIPTION OF THE DRAWINGS

The invention will be described with reference to the accompanying drawings, wherein like numbers reference like elements.

DESCRIPTION OF EXEMPLARY EMBODIMENTS

Embodiments of the invention including a method of manufacturing an electrically charged particle, an electrically charged particle, electrophoretic dispersion liquid, an electrophoretic sheet, an electrophoretic device and electronic equipment will now be described with reference to the accompanying drawings.

First Embodiment

A charged particle according to a first embodiment of the invention is firstly described. The charged particle according to the first embodiment is a positively charged particle.

Figure 1:
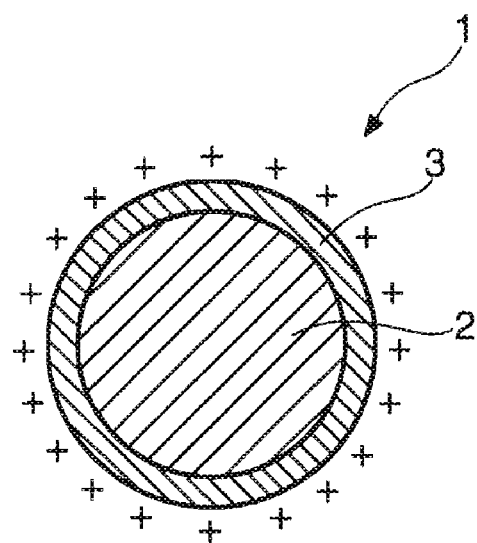
FIG. 1 is a longitudinal sectional view of a charged particle according to a first embodiment of the invention.
Figure 2:
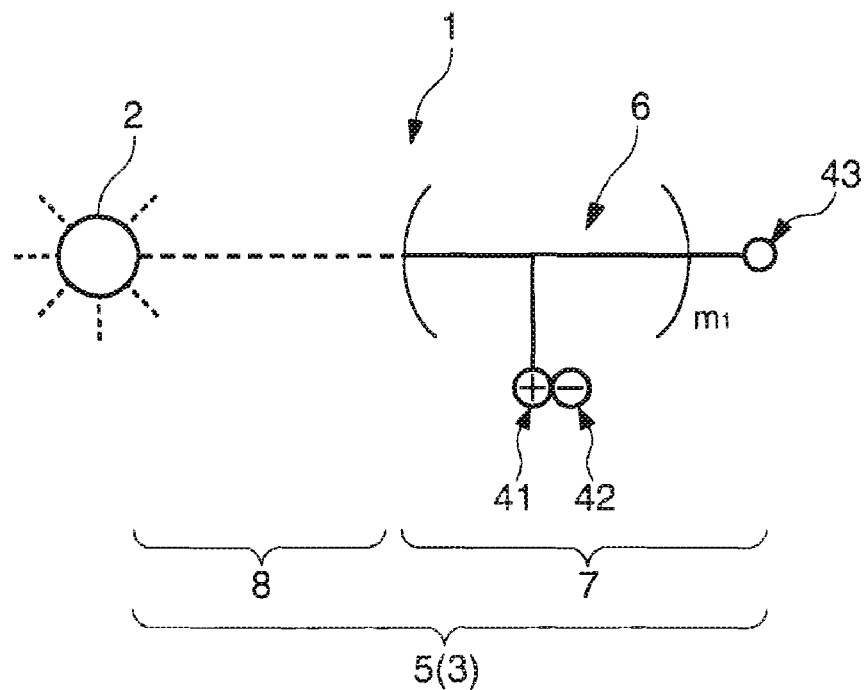
FIG. 2 schematically shows a polymeric structure which the charged particle shown in FIG. 1 has.
Figure 3:
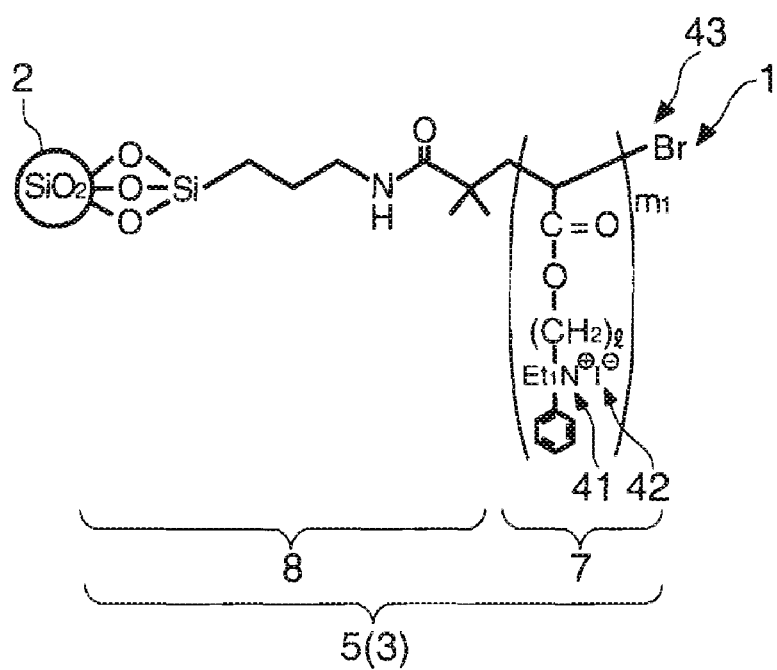
FIG. 3 is a schematic diagram showing an example of the polymer shown in FIG. 2.

FIG. 1 is a longitudinal sectional view of a charged particle according to the first embodiment of the invention. FIG. 2 schematically shows a polymeric structure which the charged particle shown in FIG. 1 has. FIG. 3 is a schematic diagram showing an example of the polymer shown in FIG. 2.

A charged particle 1 shown in FIG. 1 includes a mother particle 2 and a coating layer 3 on the surface of the mother particle 2.

As the mother particle 2, for example, a pigment particle, a resin particle or a composite particle of pigment and resin can be used. These particles can be easily fabricated.

As specific examples of the pigment particle, there are for example aniline black, carbon black, titanium black or other black pigments; titanium dioxide, antimony trioxide, barium sulfate, zinc sulfide, zinc oxide, silicon dioxide, and other white pigments; monoazo, dis-azo, polyazo, and other azo-based pigments; isoindolenone, yellow lead oxide, yellow iron oxide, cadmium yellow, titanium yellow, antimony, and other yellow pigments; monoazo, dis-azo, polyazo, and other azo-based pigments; quinacrilidone red, chrome vermillion, and other red pigments; phthalocyanine blue, indanthrene blue, prussian blue, ultramarine blue, cobalt blue, and other blue pigments; and phthalocyanine green and other green pigments. These pigments can be used alone or in combinations of two or more types for the pigment particle.

For the resin particle, for example, acrylic based resins, urethane based resins, urea based resins, epoxy based resins, polystyrene, polyester and the like can be used. These resins can be used alone or in combinations of two or more types to form the resin particle.

As for the composite particle, for example, a pigment particle whose surface is coated with a resin material, a resin particle whose surface is coated with a pigment, a particle made of a composite material of a pigment and a resin material with an appropriate mix proportion can be used.

At least a part of the surface of the mother particle 2 (or substantially the whole surface of the particle in the embodiment shown in the figure) is covered with the coating layer 3. The coating layer 3 can cover the mother particle 2 by utilizing an intermolecular force of hydrophobic interactions, electrostatic interactions or the like. It is possible to prevent the detachment of the coating layer 3 from the mother particle 2 by making use of chemical bonds such as a covalent bond, an ion bond, a hydrogen bond and the like. In case of the covalent bond, a terminal (an end) of a polymer 5 included in the coating layer 3 is bounded to the surface of the mother particle 2 as shown in FIG. 2, covering the surface of the mother particle 2 with the coating layer 3.

The polymer 5 in this embodiment has cationic groups 41 (ionic groups) at its side chains ramified from a main chain of the polymer. The cationic groups 41 impart positive electric charges to the coating layer 3. Accordingly, the charged particle 1 moves in a negative electric potential direction by the coulomb force when an electric field is applied to the particle.

As specific examples of the cationic group 41 in such polymer 5, there are N+R3 groups (ammonium groups having a hydrogen atom or a alkyl group on the nitrogen atom), iminium groups having a hydrogen atom or a alkyl group on the nitrogen atom, pyridinium groups having a hydrogen atom or a alkyl group on the nitrogen atom, ferrocenium groups and the like.

The cationic groups 41 may present with anions 42 as counter ions to form salt. In this case, the salt is ionized into the cationic groups 41 and the anions 42 when the salt is dissolved in a solvent.

The polymer 5 having the cationic groups 41 on its side chains can be relatively easily synthesized by a hereinafter described living polymerization.

The number of the cationic groups 41 in the polymer 5 can be easily controlled by changing the number "$m_1$" of the constitutional units 6 which have the cationic groups 41. In this way, it is possible to control the amount of the positive charge of the charged particle 1 by employing the coating layer 3 made of such polymer 5.

It is preferable that the polymer 5 have more than 300 of the cationic groups 41 (constitutional units 6) in its molecular structure. More preferably, the polymer 5 should have more than 600 of the cationic groups 41, whereby the amount of charge of the charged particle 1 can be sufficient.

A repeated sequence (hereinafter called "charged part 7") of the constitutional unit 6 having the cationic group 41 in the polymer 5 may be directly coupled to the surface of the mother particle 2 or may be coupled to the surface of the mother particle 2 through a coupling part 8 (coupling structure) as shown in FIG. 2.

The coupling part 8 can be obtained by providing a first chemical compound that has a first functional group at one end and a second functional group at the other end on the surface of the mother particle 2. The first functional group reacts with and is bonded to the surface of the mother particle 2. The coupling part 8 can also be obtained by further providing a second chemical compound that has a third functional group at one end and a substituent group that becomes a starting point of polymerization at the other end. The third functional group reacts with either the surface of the mother particle 2 or the second functional group of the first chemical compound. The second chemical compound is reacted thereafter the monomer is reacted with the substituent group which is the starting point of the polymerization by a living polymerization method and the like.

Types of the first chemical compound and the second chemical compound and an example of the forming method of the coupling part 8 will be described in detail in a hereinafter described method of manufacturing the charge particle 1.

As a specific example of the above-described polymer 5, the one shown in FIG. 3 can be used. The adsorption amount of the polymer 5 with respect to the surface of the mother particle 2 is set for example within a range of about 0.2-3.0 nmol/cm², more typically set to a range of 0.7-1.6 nmol/cm².

The above-described charged particle 1 can be manufactured for example in a hereinafter described way. A method of manufacturing the charged particle 1 according to the first embodiment (a method of manufacturing charged particles of the invention) will now be described.

Figure 4:
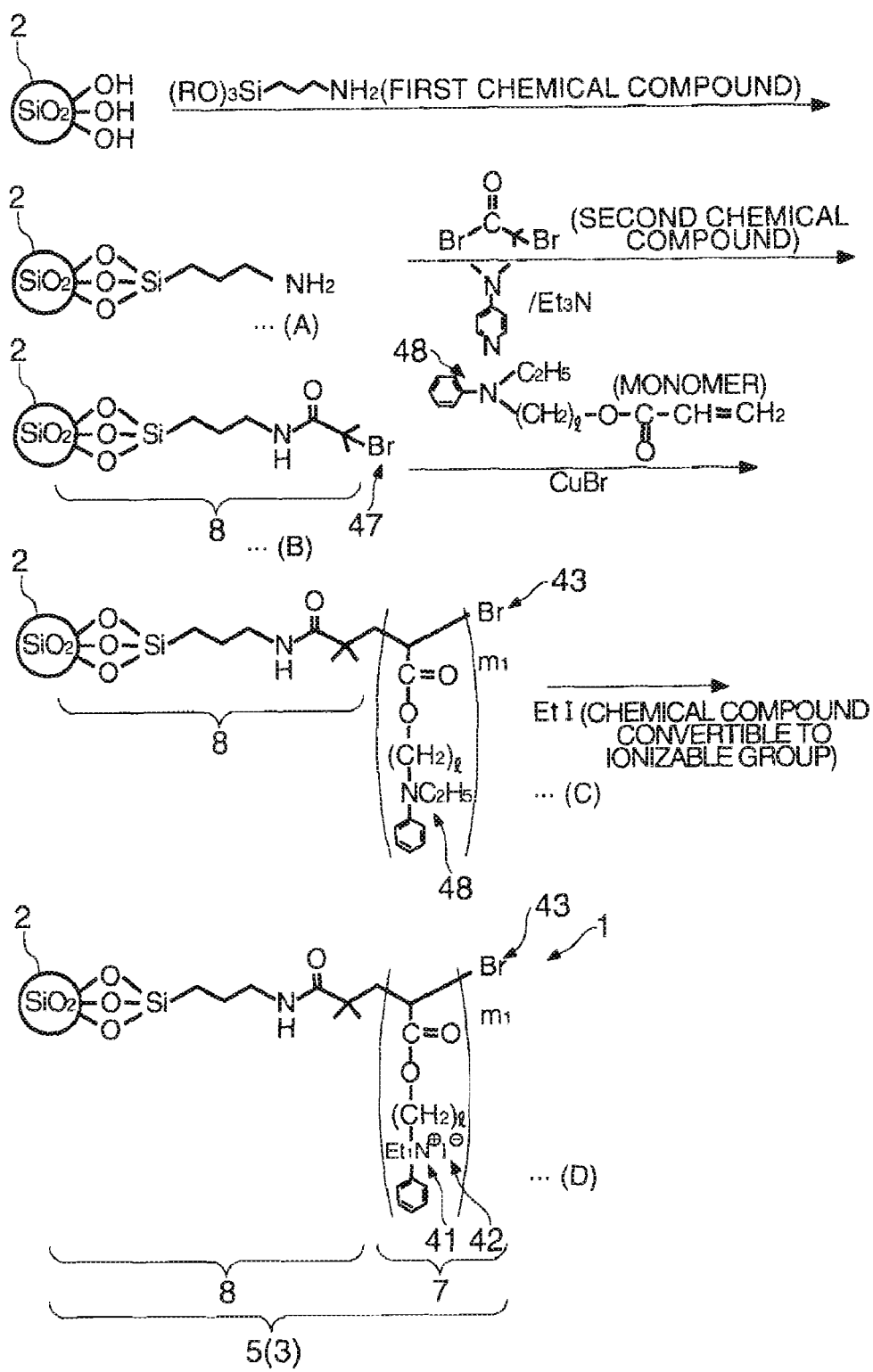
FIG. 4 is a schematic diagram for explaining a manufacturing method of the charged particle shown in FIG. 3.

FIG. 4 is a schematic diagram for explaining a manufacturing method of the charged particle shown in FIG. 3.

1A: Firstly, provide the mother particle 2 (a first step).

2A: Next, form the coating layer 3 on the surface of the mother particle 2 (a second step).

2A-1: An example of the formation of the coating layer 3 is now described. Firstly, the particle is contacted with a solution containing a first chemical compound. The first chemical compound has a first functional group which reacts and is bonded to the surface of the mother particle 2 at its one end and has a second functional group at the other end. Secondly, the particle is contacted with a solution containing a second chemical compound. The second chemical compound has a third functional group which reacts with the second functional group at its one end and has a polymerization initiation group 47 at the other end.

The first functional group of the first chemical compound can be for example a thiol group, a sulfonate group, a carboxyl group, a tertiary amino group, a phosphate group, a cyano group, a halogen group, an alkoxysilyl group, a silyl halide group, an amide group and the like. In addition to these groups, the first functional group can be obviously ones that are electrostatically bonded or hydrogen bonded to the surface of the mother particle 2.

Where the mother particle 2 is made of a material in which a hydroxyl group exposes at the surface, such as $SiO_2$ as shown in FIG. 2, an alkoxysilyl group is preferably employed as the first functional group. If a chemical compound having the alkoxysilyl group as the first functional group as represented by the hereunder chemical formula 1 is reacted with the mother particle 2, a condensation reaction occurs at the surface of the mother particle 2 as shown by formula A in FIG. 4 and a strong bond can be formed there.

The second functional group of the first chemical compound can be for example an amino group, a hydroxy group, a carboxyl group, a phosphate group, an amide group and the like.

The chemical compound represented by the hereunder chemical formula 1 is a specific example of the first chemical compound.

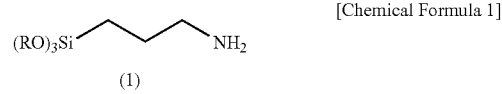

[Chemical Formula 1]

(1)

where R denotes an alkyl group.

Where the second functional group of the first chemical compound is an amino group or a hydroxy group, the third functional group of the second chemical compound can be for example a halogen group, a thiol group, a sulfone group, a carboxyl group, a tertiary amino group, a phosphate group, a halide acid group, an alkoxysilyl group, a silyl halide group, a sulfonyl halide group and the like. Where the second functional group is a carboxyl group, the third functional group can be for example a hydroxy group, an amino group and the like.

The polymerization initiation group 47 of the second chemical compound can be for example a halogen group, a carbonyl group, a hydrosilyl group, an amino group and the like.

It is preferable that the second chemical compound have 1-10 carbons, more preferably 2-7 carbons.

As a specific example of such second chemical compound, there is a chemical compound of the hereunder chemical formula 2:

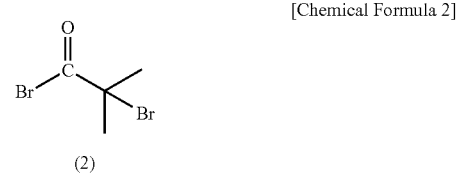

[Chemical Formula 2]

(2)

When the second chemical compound of the formula 2 having an acid bromide group is reacted with the particle in which an amino group was introduced at its end through the reaction of the first chemical compound with the mother particle 2 as shown by the formula A in FIG. 4, an amino bond is formed as shown by formula B in FIG. 4 and the particle in which a bromine group is introduced as the polymerization initiation group 47 at its end is formed.

The process to react the first chemical compound then the second chemical compound with the mother particle 2 is now described in detail. Anhydrous tetrahydrofuran, 3-aminopropyl-trimethoxysilane (the first chemical compound) and silica particles are put in a flask with a stirring bar and then stirred so as to obtain a suspension. The silica particles are preferably heated under a reduced pressure and dried in advance. The suspension is refluxed for a certain time period and then cooled to a room temperature. The suspension is then taken out from the flask and supernatant of the suspension is removed by centrifugal separation. The residue (in solid phase) is washed at a couple of times with tetrahydrofuran. Subsequently, the residue is heated under a reduced pressure and dried.

Next, when a solution containing the second chemical compound contacts with the surface of the mother particle 2, the third functional group of the second chemical compound reacts and bonds with the second functional group of the first chemical compound. Where the chemical compound represented by the chemical formula 2 is employed as the second chemical compound, for example, the acid bromide group of the second chemical compound reacts with the amino group of the first chemical compound as shown by the formula B in FIG. 4, and an amino bond is formed.

To be more specific, dichloromethane, triethylamine, 2-bromoisobutylylbromide (the second chemical compound), a catalytic amount of 4-(dimethylamino) pyridine and silica particles to which 3-aiminopropyl-trimethoxysilane is bonded are put in a flask with a stirring bar and stirred to react for a certain time period. After the stirring, the reaction is stopped by adding ethanol into the reacted solution. Subsequently, the reacted solution is taken out of the flask supernatant of the solution is removed by centrifugal separation. The residue (in solid phase) is washed at a couple of times with dichloromethane. The residue is then heated under a reduced pressure and dried.

Consequently, an organic group having the polymerization initiation group 47 (a Br group in this case) at its end is coupled to the mother particle 2.

As a method to contact the solution with the surface of the mother particle 2, there are for example: I. Immerse the mother particle 2 into the solution (an immersion method), II. Apply the solution onto the surface of the mother particle 2 (an application method), III. Provide the solution in a shower-like form to the surface of the mother particle 2 (a spray method) or the like.

As a solvent used to prepare the solution, in addition to the tetrahydrofuran and the dichloromethane, for example, water, methanol, ethanol, isopropyl-alcohol, acetonitrile, ethyl acetate, other, methylene chloride, N-methyl-2-pyrrolidone (NMP), or any combination thereof can be used.

Where the immersion method is employed, the solution of the first chemical compound may be irradiated with ultrasound for a certain period if required. This allows the coupling part 8 having the polymerization initiation group 47 to be more densely bonded at the surface of the mother particle 2.

2A-2: Next, the charged part 7 is formed in the coupling part 8 having the polymerization initiation group 47 and at the side opposite to the mother particle 2. In this way, the polymer 5 is obtained (synthesized). The charged part 7 is formed in the following way: A monomer having a functional group which can be converted into the cationic group 41 or a functional group which can become the cationic group 41 by bonding other chemical compounds (all of these groups are hereinafter called "cationic precursor group 48") is polymerized through living polymerization (particularly atom transfer radical polymerization or ATRP) which starts at the polymerization initiation group 47. In this way, the polymer having the cationic precursor group 48 at its side chain ramified from the main chain is synthesized. Subsequently, the cationic precursor group 48 is turned to the cationic group 41 and the charged part 7 is formed.

The living polymerization can be performed by for example contacting the surface of the mother particle 2, to which the coupling part 8 having the polymerization initiation group 47 is bonded, with a solution of a monomer having the cationic precursor group 48 and a catalyst. Firstly, the monomer having the cationic precursor group 48 is provided. As the monomer having the cationic precursor group 48, for example, unsubstantiated or substituted amino groups and the like can be used. Particularly, a disubstituted amino group is preferable and an amino group in which at least one of the substituent groups is an aromatic group like the one shown by the hereunder chemical formula 3 is especially preferred as the monomer having the cationic precursor group 48.

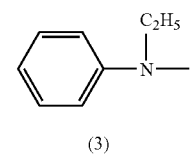

[Chemical Formula 3]

(3)

As the polymerization group which the above-mentioned monomer has, for example, ones having a carbon-carbon double bond such as a vinyl group, a styryl group, a (meta-) acryloyl group or the like, and ones producing a ring-opening reaction such as a norbornyl group, an epoxy group, an oxetanil group or the like can be used. It is preferable that monomers which have the styryl group or the (meta-) acryloyl group be used in terms of a relatively high polymerization activity and cost. A specific example of such monomer is given by the hereunder chemical formula 4.

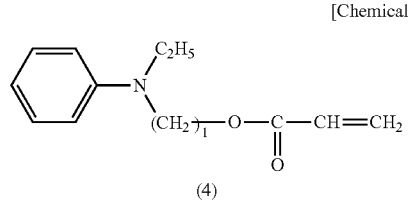

[Chemical Formula 4]

(4)

"l" in the chemical formula 4 ranges to the extent where electron delocalization of aromatic series and the like is large enough but the polymerization group will not be electronically and sterically perturbed or to the extent where a steric hindrance can be prevented or restrained between the synthesized polymers 5.

In stead of the cationic precursor group 48, monomers having an ammonium group, a carboxylate group, a sulfonate group and the like can be used for the polymerization reaction. In this case, the conversion to the ionic group is not necessary.

For the catalyst, ones whose propagation site can turn into an polymerization initiation group 43 in a propagation process of the polymer 5 and which are unreactive or less reactive to the cationic precursor group 48 or which has a relatively low Lewis acidity can be used. Such catalyst includes for example halide of transition metals such as Cu, Fe, Au, Ag, Hg, Pd, Pt, Co, Mn, Ru, Mo and Nb, and transition metal complexes in which an organic group such as copper phthalocyanine is coordinated as a ligand. Among them, the transition metal halide based catalyst is preferably used.

As a solvent used to prepare the solution, for example, water; alcohols such as methanol, ethanol and butanol; hydrocarbons such as hexane, octane, benzene, toluene and xylene; others such as diethylether and tetrahydrofuran; halogenated aromatic hydrocarbon such as chlorobenzene and o-dichlorobenzene can be used. These can be used alone or any combination thereof as a mixed solvent.

A polymerization reaction occurs between the polymerization initiation group 47 and the polymerization group of the monomer when the surface of the mother particle 2 to which the coupling part 8 having the polymerization initiation group 47 is bonded is contacted with this solution. The propagation site always turns to the polymerization initiation group 43 during the propagation process of the polymer 5, and a polymerization reaction is further taken place between the polymerization initiation group 43 and the polymerization group of the monomer. In this way, the polymer is synthesized (produced).

A polymer having the polymerization initiation group 43 at the end opposite to the mother particle 2 is formed when for example the chemical compound of the chemical formula 4 is employed as the monomer and CuBr as the catalyst.

In the living polymerization, a propagating site always has polymerization activity during the propagation process of the polymer so that the monomer is consumed. If more monomer is added after the polymerization reaction has stopped, the polymerization reaction will further progress.

Accordingly, it is possible to accurately control the number of the cationic groups 41 which the synthesized polymer 5 will have by adjusting the amount of the monomer supplied to the reaction system, the reaction time and the catalyst amount according to a desired degree of the polymerization.

Furthermore, it is possible to obtain the coating layer 3 with a relatively even thickness because the polymer 5 in which the distribution of the polymerization degree is uniform.

Consequently, it is possible to form the coating layer 3 which has a desired amount of electric charge through simple processes while minimizing the variation of the charged particle 1.

It is preferable that deoxidation of the above-mentioned solution (reaction solution) be performed before conducting the polymerization reaction. As such deoxidation methods, there are substitution after vacuum deaeration with an inactive gas such as an argon gas and a nitrogen gas, a purging process and the like.

As for the polymerization reaction, the solution may be heated (warmed) to a predetermined temperature (at which the monomer and the catalyst are activated) so that the polymerization reaction of the monomer can be more promptly and assuredly performed. This temperature will slightly differ according to a type of the catalyst and is not especially limited. However, about 30-100° C. is preferred. The heating time (reaction time) will be preferably about 10-20 hours in case of the heating temperature of 30-100° C.

The above-mentioned polymerization reaction is preferably performed in a reaction container equipped with an ultrasonic generator, a stirring machine, a reflux condenser, a dripping funnel, a temperature controller and a gas feeding opening. More specifically, a reaction container equipped with a condenser pipe, an argon gas feeding measure and a stirring blade is provided. A methanol solution of the monomer of the chemical formula 4 is prepared in this reaction container, and CuBr (catalyst) and 2,2-bipyridyl which is going to be a ligand of the catalyst are then added to the methanol solution. The mother particle 2 to which the coupling part 8 having the polymerization initiation group 47 is bonded is immersed in the solution and oxygen is then removed by supplying an argon gas to the solution. The solution thereafter is stirred for about 20 hours at the temperature of 40-60° C. under an argon atmosphere.

Next, the cationic precursor group 48 is converted into the cationic group 41. In this embodiment, the cationic precursor group 48 is turned into a salt composed of the cationic group 41 and the conjugated anion 42. This can be done by for example contacting the surface of the mother particle 2 to which the polymer is coupled with a solution containing a chemical compound which can convert the cationic precursor group 48 into the salt (the cationic group 41).

As such chemical compound that can convert the cationic precursor group 48 into the salt, there are for example acids such as hydrogen chloride, hydrogen bromide and hydrogen iodide and halogenated hydrocarbons such as ethane iodide and methane iodide.

As a solvent used to prepare this solution, the same solvent used to prepare the above-mentioned monomer solution can be used. By using ethane iodide as the chemical compound that can convert the cationic precursor group 48 into the salt, for instance, the polymer 5 having the cationic group 41 of the formula D shown in FIG. 4 can be obtained.

Second Embodiment

A charged particle according to a second embodiment of the invention will be described. Different features and points of the charged particle 1 from that of the first embodiment will be mainly described and descriptions for the same configurations and structures will be omitted.

Figure 5:
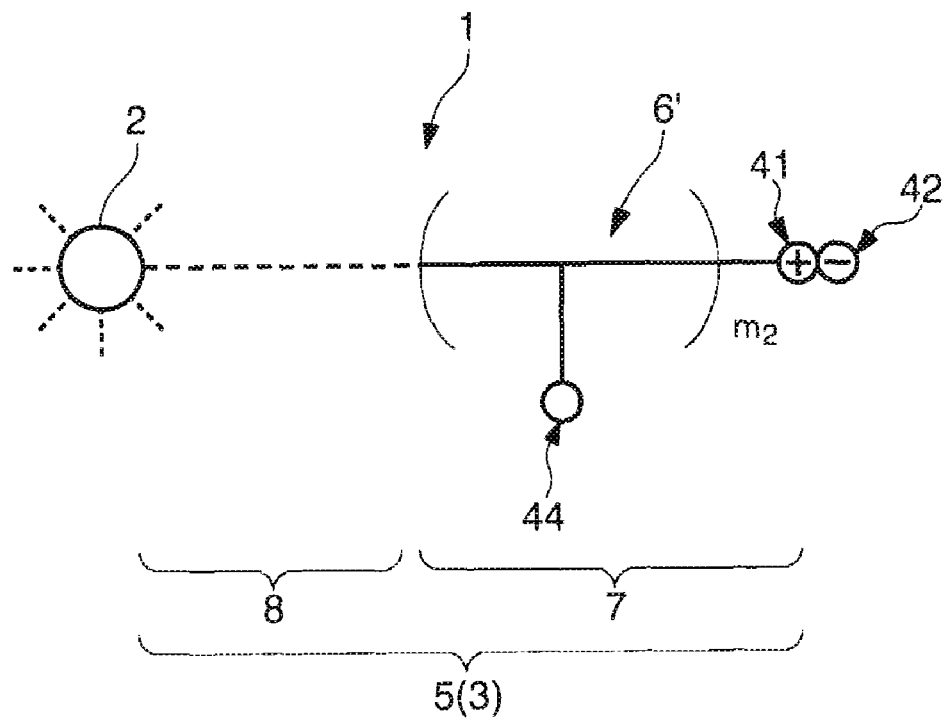
FIG. 5 schematically shows a polymeric structure which a charged particle according to a second embodiment of the invention has.
Figure 6:
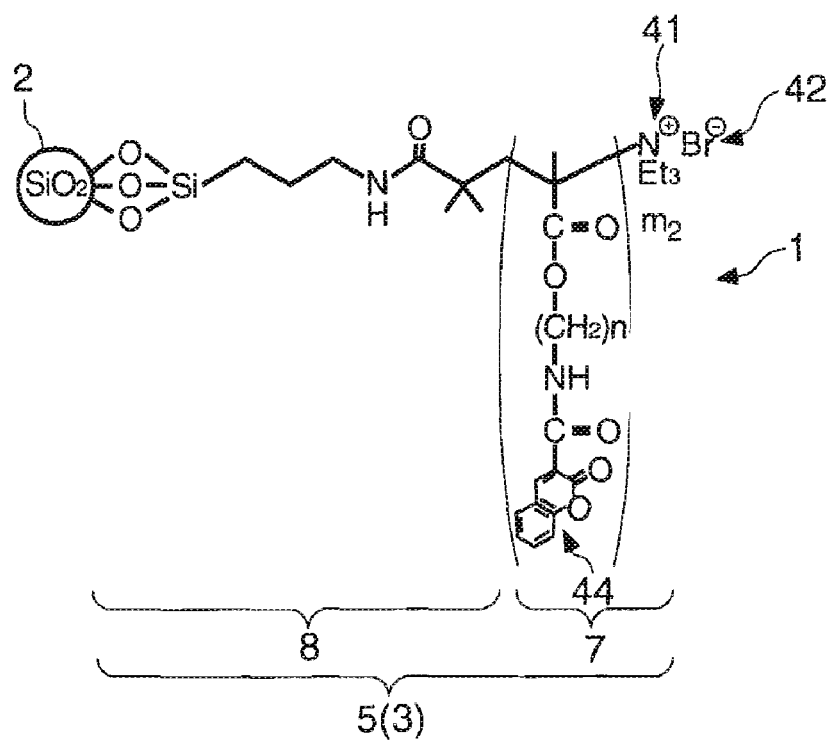
FIG. 6 is a schematic diagram showing an example of the polymer shown in FIG. 5.

FIG. 5 schematically shows a polymeric structure which a charged particle according to the second embodiment has. FIG. 6 is a schematic diagram showing an example of the polymer shown in FIG. 5.

The charged particle 1 according to the second embodiment is a positively charged particle and has the same structure as that of the first embodiment except for the composition of the polymer 5 that makes up the coating layer 3. It follows that the polymer 5 of the second embodiment has the cationic group 41 at the terminal of its main chain (the other end) and at least one (more than one in this embodiment) colorant part 44 in its molecular structure.

Where the polymer 5 has the chromophore 44 (chromophore groups 44), the charged particle 1 can be colored with a desired color. The chromophore 44 can be for example ones having an electronic conjugation system or d-electron such as transition metals, more specifically, atom groups that has the same skeletal structure as that of a colorant. As the colorant, there are for example a coumalin based colorant, a cyan based colorant, a xanthene based colorant, an azo-based colorant, a chlorophyll based colorant, a cyanine based colorant, an anthraquinone based colorant, a polycyclic quinone based colorant, metal complexes such as a ruthenium complex, a ferric complex, an osmium complex, a copper complex and a platinum complex or any combination thereof. The chromophore 44 includes not only the ones simply color something but also ones that emit light whose wave length is longer than that of the blue color.

The charged particle 1 in this embodiment shows a color of yellow because the polymer 5 has the chromophore 44 including a coumalin skeleton as shown in FIG. 6. The chromophore 44 may be introduced in a side chain ramified from the main chain of the polymer 5 or in a part of the main chain. However, it is preferred that the chromophore 44 be introduced in the side chain as shown in FIG. 5 and FIG. 6. The polymer 5 having the chromophore 44 at its side chain can be easily synthesized through a hereinafter described living polymerization.

It is possible to control the number of the chromophore groups 44 in the polymer 5 simply by changing a parameter "$m_2$" which is the number of the constitutional unit 6' that has the chromophore 44. Accordingly, a color intensity of the charged particle 1 can be adjusted to a desired tone since the coating layer 3 is made of such polymer 5.

The polymer 5 preferably has more than 300 of the chromophore groups 44 (constitutional units 6') in its molecular structure, more preferably more than 1000 of the chromophore groups 44. In this way, the charged particle 1 is certainly colored with the color of the chromophore 44.

Such charge particle 1 can be formed for example in the following way.

A manufacturing method of the charged particle 1 (a method of manufacturing a charged particle of the invention) according to the second embodiment is hereinafter described.

Figure 7:
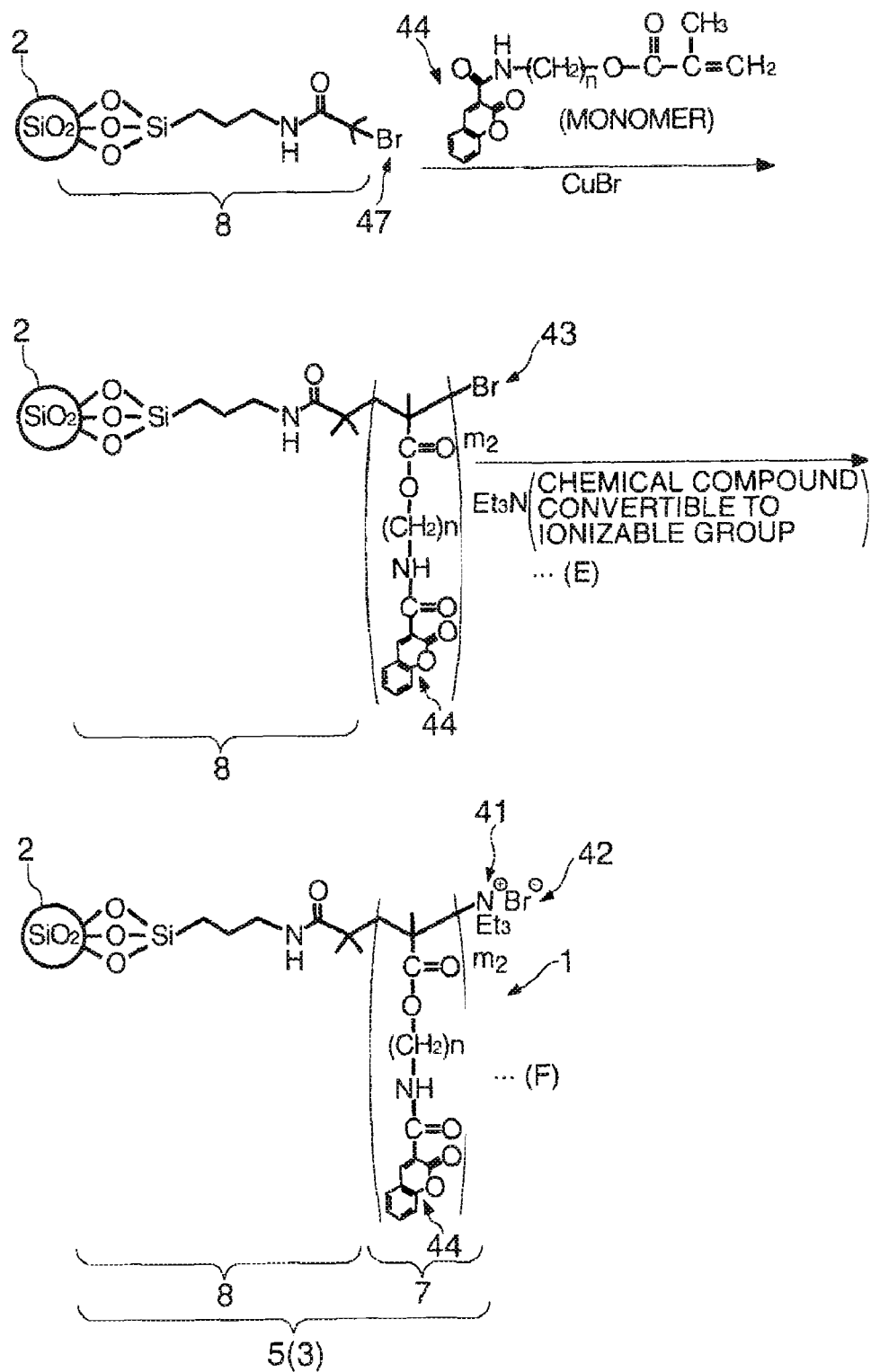
FIG. 7 is a schematic diagram for explaining a manufacturing method of the charged particle shown in FIG. 6.

FIG. 7 is a schematic diagram for explaining a manufacturing method of the charged particle shown in FIG. 6.

1B: Firstly, prepare the mother particle 2 (a first step).

2B: Secondly, form the coating layer 3 on the surface of the mother particle 2 (a second step).

2B-1: A chemical compound (the coupling part 8) having the polymerization initiation group 47 is firstly bonded to the surface of the mother particle 2. This can be carried out in the same way as the above-described step 2A-1.

2B-2: The charged part 7 is then formed in the coupling part 8 having the polymerization initiation group 47 and at the side opposite to the mother particle 2. In this way, the polymer 5 is obtained (synthesized). This can be conducted by using the monomer having the hereunder chromophore 44 and in the same way as the step 2A-2.

As the polymerization group which the above-mentioned monomer has, for example, ones having a carbon-carbon double bond such as a vinyl group, a styryl group, a (meta-) acryloyl group or the like, and ones producing a ring-opening reaction such as a norbornyl group, an epoxy group, an oxetanil group or the like can be used. It is preferred that monomers which have the styryl group or the (meta-) acryloyl group be used in terms of a relatively high polymerization activity and a low cost. A specific example of such monomer is given by the hereunder chemical formula 5.

[Chemical Formula 5]

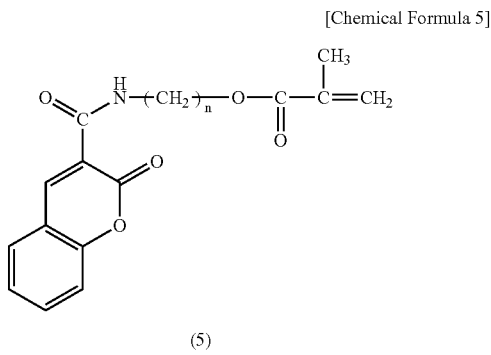

(5)

Where "n" in the chemical formula 5 is a positive integer of 1-20, more preferably 3-15. The range of the "n" corresponds to the extent where electron delocalization of aromatic series is large enough but the polymerization group will not be electronically and sterically perturbed or to the extent where a steric hindrance can be prevented or restrained between the synthesized polymers 5.

The monomer of the chemical formula 5 can be synthesized through for example the following synthetic pathway:

[Chemical Formula 6]

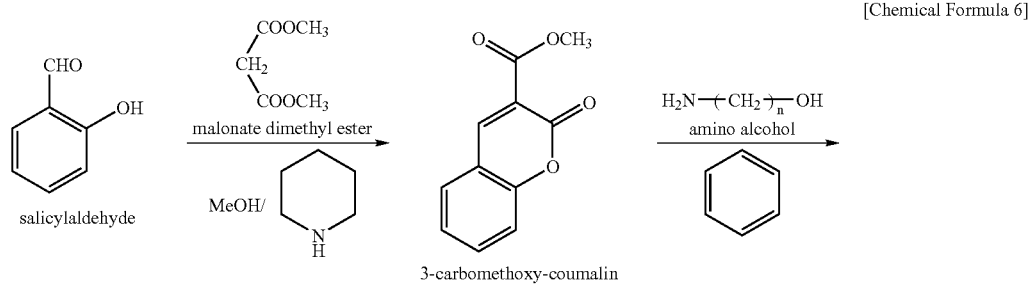

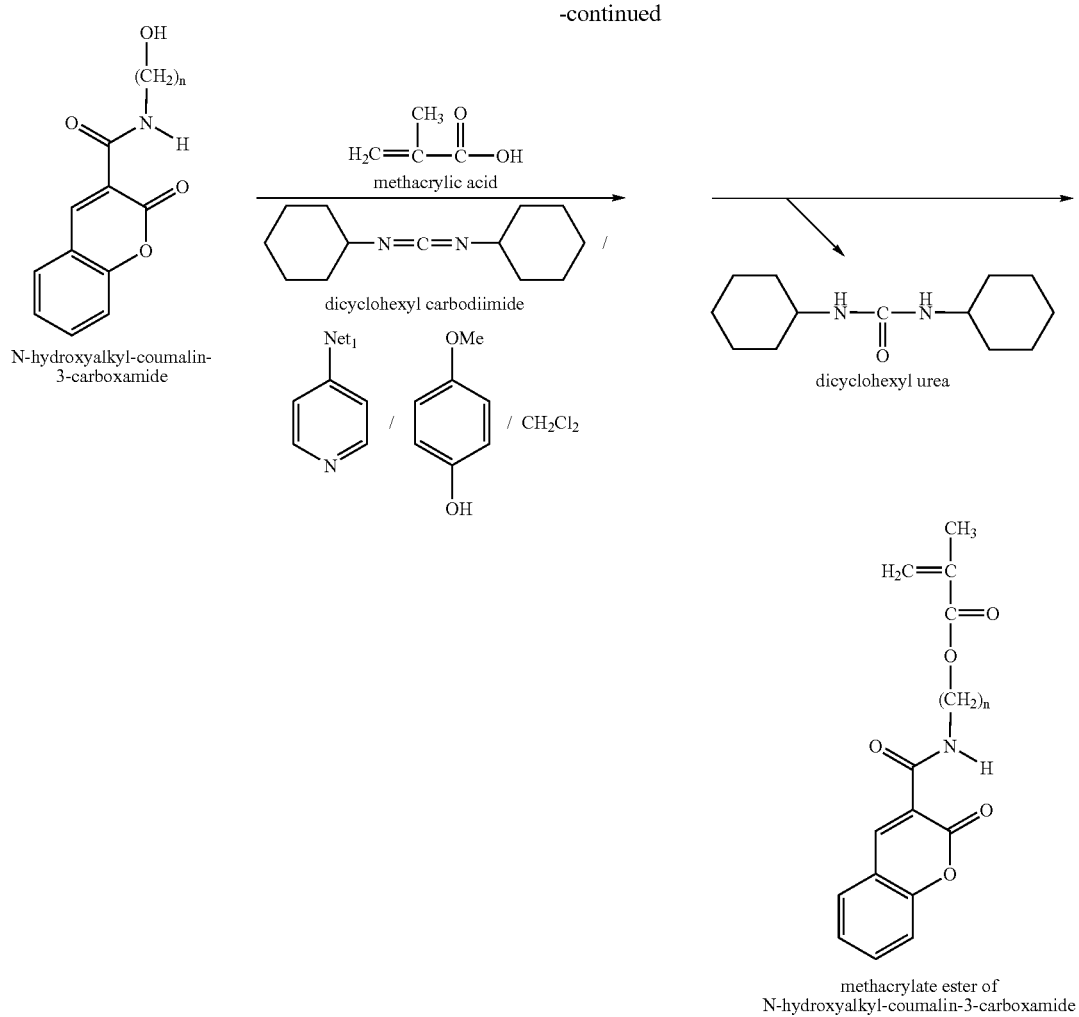

methacrylate ester of
N-hydroxyalkyl-coumalin-3-carboxamide

To start with, salicylaldehyde is reacted with malonate dimethyl ester so as to obtain 3-carbomethoxy-coumalin. More specifically, an equal mol amount of malonate dimethyl ester and a prescribed amount of methanol and piperidine are added to salicylaldehyde and they are then left for a certain time under the room temperature. A solvent is removed thereafter and the solution is refined by silica-gel chromatography.

Next, the obtained 3-carbomethoxy-coumalin is reacted with amino alcohol to obtain N-hydroxyalkyl-coumalin-3-carboxamide. To be more specific, the 3-carbomethoxy-coumalin and the amino alcohol are added to a prescribed amount of benzene and they are refluxed as stirred. After the reflux, they are crystallized by cooling and adding a seed crystal. Recrystallization is then repeatedly performed as adding a predetermined solvent.

Next, the obtained N-hydroxyalkyl-coumalin-3-carboxamide is reacted with methacrylic acid and dicyclohexyl carbodiimide in order to obtain a methacrylate ester of N-hydroxyalkyl-coumalin-3-carboxamide. More specifically, the N-hydroxyalkyl-coumalin-3-carboxamide is dissolved by adding 4-diethylamino pyridine, 4-methoxyphenol and methylene dichloride. A methylene dichloride solution of methacrylic acid and a methylene dichloride solution of dicyclohexyl carbodiimide are further added to the solution. The mixed solution is left in the room temperature thereafter and a produced dicyclohexyl urea is removed by filtration and the like. After a solvent is removed from the filtrate, the residue is dissolved in a prescribed amount of benzene and cyclohexane and left for a certain time. Sellite is then added and the solution is stirred. Subsequently, the sellite is removed by filtration or the like. The filtrate is cooled and skimmed and the obtained residue is then suspended in a predetermined solvent. A crystal is formed while this suspension is left under the room temperature. The crystal is collected and then recrystallized by using a prescribed solvent. Through such processes, the monomer of the chemical formula 5 is obtained.

The polymerization reaction occurs between the polymerization initiation group 47 and the polymerization group of the monomer when the surface of the mother particle 2 to which the coupling part 8 having the polymerization initiation group 47 is bonded is contacted with this solution of the monomer and the catalysis. The propagation site always turns to the polymerization initiation group 43 during the propagation process of the polymer 5, and a polymerization reaction is further taken place between the polymerization initiation group 43 and the polymerization group of the monomer. In this way, the polymer is synthesized (produced).

A polymer having the polymerization initiation group 43 at the end opposite to the mother particle 2 as shown by the formula E in FIG. 7 is formed when for example the chemical compound of the chemical formula 5 is employed as the monomer and CuBr as the catalyst.

The solvent for preparing the solution, deoxidation process, a type of the catalyst, conditions of the polymerization reaction and the like can be same as those of the first embodiment. More specifically, a reaction container equipped with a condenser pipe, an argon gas feeding measure and a stirring blade is provided. A methanol solution of the monomer of the chemical formula 5 is prepared in this reaction container, and CuBr (catalyst) is then added to the methanol solution. The mother particle 2 to which the coupling part 8 having the polymerization initiation group 47 is bonded is immersed in the solution and oxygen is then removed by supplying an argon gas to the solution. The solution thereafter is heated to a predetermined temperature under an argon atmosphere and this temperature is maintained for a prescribed time period as stirring the solution.

Next, the polymerization initiation group 43 is converted into the cationic group 41. In this embodiment, the polymerization initiation group 43 is turned into a salt composed of the cationic group 41 and the conjugated anion 42. This can be done by for example contacting the surface of the mother particle 2 to which the polymer is coupled with a solution containing a chemical compound which can convert the polymerization initiation group 43 into the salt (the cationic group 41).

As such chemical compound that can convert the polymerization initiation group 43 into the salt, there are for example amines having an organic group at a nitrogen atom such as ammonia and triethylamine, and a chemical compound having an amino group.

As a solvent for preparing this solution, the same solvent used to prepare the above-mentioned monomer solution can be used.

By using triethylamine as the chemical compound that can convert the polymerization initiation group 43 into the salt, for instance, the polymer 5 having the cationic group 41 of the formula F shown in FIG. 7 can be obtained.

In this embodiment, after the polymer having the polymerization initiation group 43 at its terminal as shown by the formula E in FIG. 7 is obtained, other functional group can be once introduced to the terminal and then it is converted to the ionic group instead it is directly turned into the ionic group. For example, the polymer of the formula E shown in FIG. 7 is reacted with an organic metal compound such as an aminoalkyl tin compound under the existence of a catalyst such as palladium. This generates a coupling reaction and an amino group is introduced into the terminal group. The terminal is further reacted with alkyl halide and an ammonium group is introduced into the terminal as the ionic group.

Third Embodiment

A charged particle according to a third embodiment of the invention will be described. Different features and points of the charged particle 1 from that of the first embodiment will be mainly described and descriptions for the same configurations and structures will be omitted.

Figure 8:
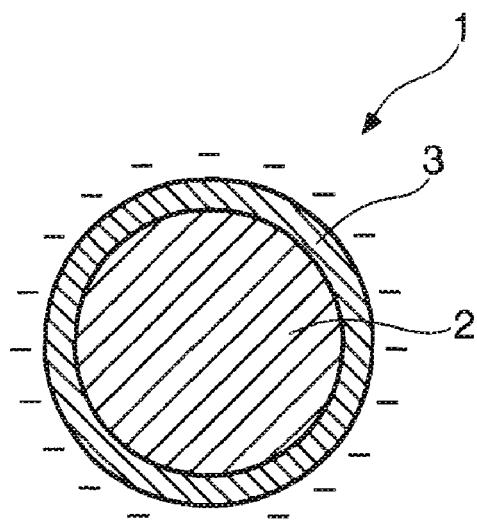
FIG. 8 is a longitudinal sectional view of a charged particle according to a third embodiment of the invention.
Figure 9:
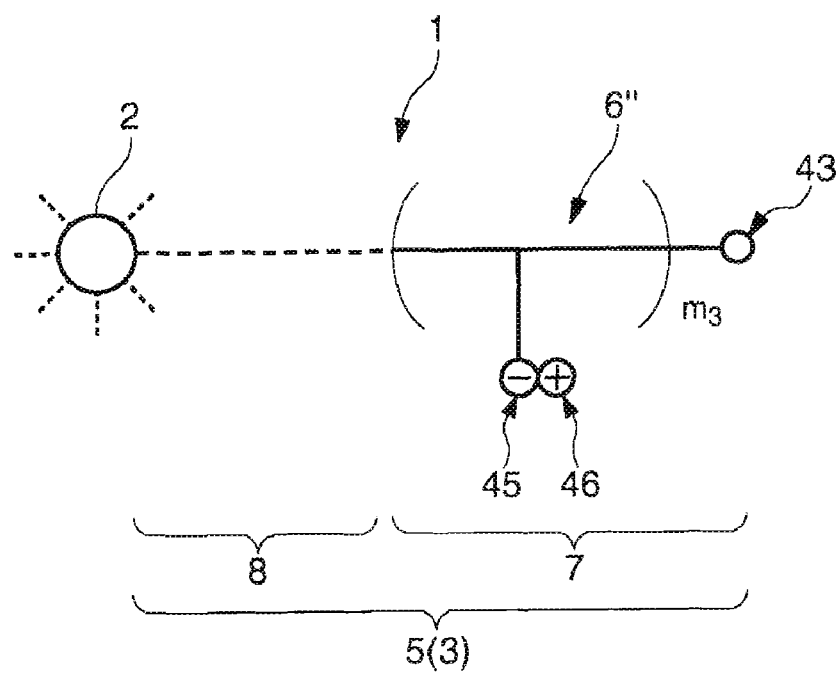
FIG. 9 schematically shows a polymeric structure which the charged particle shown in FIG. 8 has.
Figure 10:
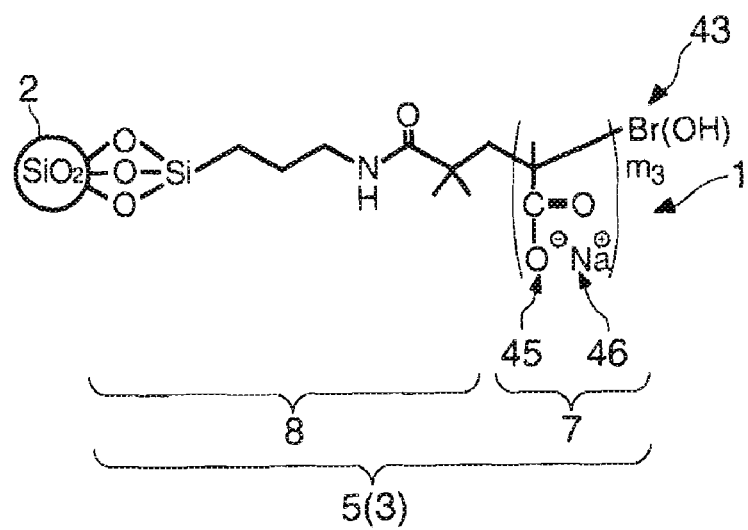
FIG. 10 is a schematic diagram showing an example of the polymer shown in FIG. 9.

FIG. 8 is a longitudinal sectional view of a charged particle according to the third embodiment. FIG. 9 schematically shows a polymeric structure which the charged particle shown in FIG. 8 has. FIG. 10 is a schematic diagram showing an example of the polymer shown in FIG. 9.

The charged particle 1 according to the third embodiment is a negatively charged particle and has the same structure as that of the first embodiment except for the composition of the coating layer 3. It follows that the coating layer 3 of the third embodiment has the polymer 5 in which the terminal (the other end) of the main chain is coupled to the surface of the mother particle 2 and an anionic group 45 (an ionic group) is situated at the side chains ramified from the main chain.

The anionic groups 45 impart negative electric charges to the coating layer 3. Accordingly, the charged particle 1 moves in a positive electric potential direction by the coulomb force when an electric field is applied to the particle.

The coating layer 3 is formed of the polymers 5 that have a plurality of the anionic groups 45 and are coupled to the surface of the mother particle 2 so that the coating layer 3 is charged significantly negative. Therefore, the charged particle 1 having such coating layer 3 shows a high sensitivity to an electric field.

As the anionic group 45 of the polymer 5, a carboxylate group, a sulfonate group, a phenolate group, a phosphate group, a phosphate anion group or the like can be used.

The anionic group 45 may present with a cation 46 as a counter ion to form salt. In this case, the salt is ionized into the anionic group 45 and the cation 46 when the salt is dissolved in a solvent.

The polymer 5 having the anionic groups 45 on its side chains can be relatively easily synthesized by a hereinafter described living polymerization.

The number of the anionic groups 45 in the polymer 5 can be easily controlled by changing the number "$m_3$" of the constitutional units 6" which have the anionic groups 45. In this way, it is possible to control the amount of the negative charges of the charged particle 1 by employing the coating layer 3 made of such polymer 5.

It is preferable that the number of the anionic groups 45 (the constitutional units 6") in the molecular structure of the polymer 5 be the same as that of the cationic groups 41 (the constitutional units 6) of the first embodiment, whereby the amount of charge of the charged particle 1 can be sufficient.

A specific example of such polymer 5 is shown in FIG. 10.

It is preferred that the adsorption amount of the polymer 5 with respect to the surface of the mother particle 2 be same as that of the first embodiment.

The above-described charged particle 1 can be manufactured for example in a hereinafter described way. A method of manufacturing the charged particle 1 according to the third embodiment (a method of manufacturing charged particles of the invention) will now be described.

Figure 11:
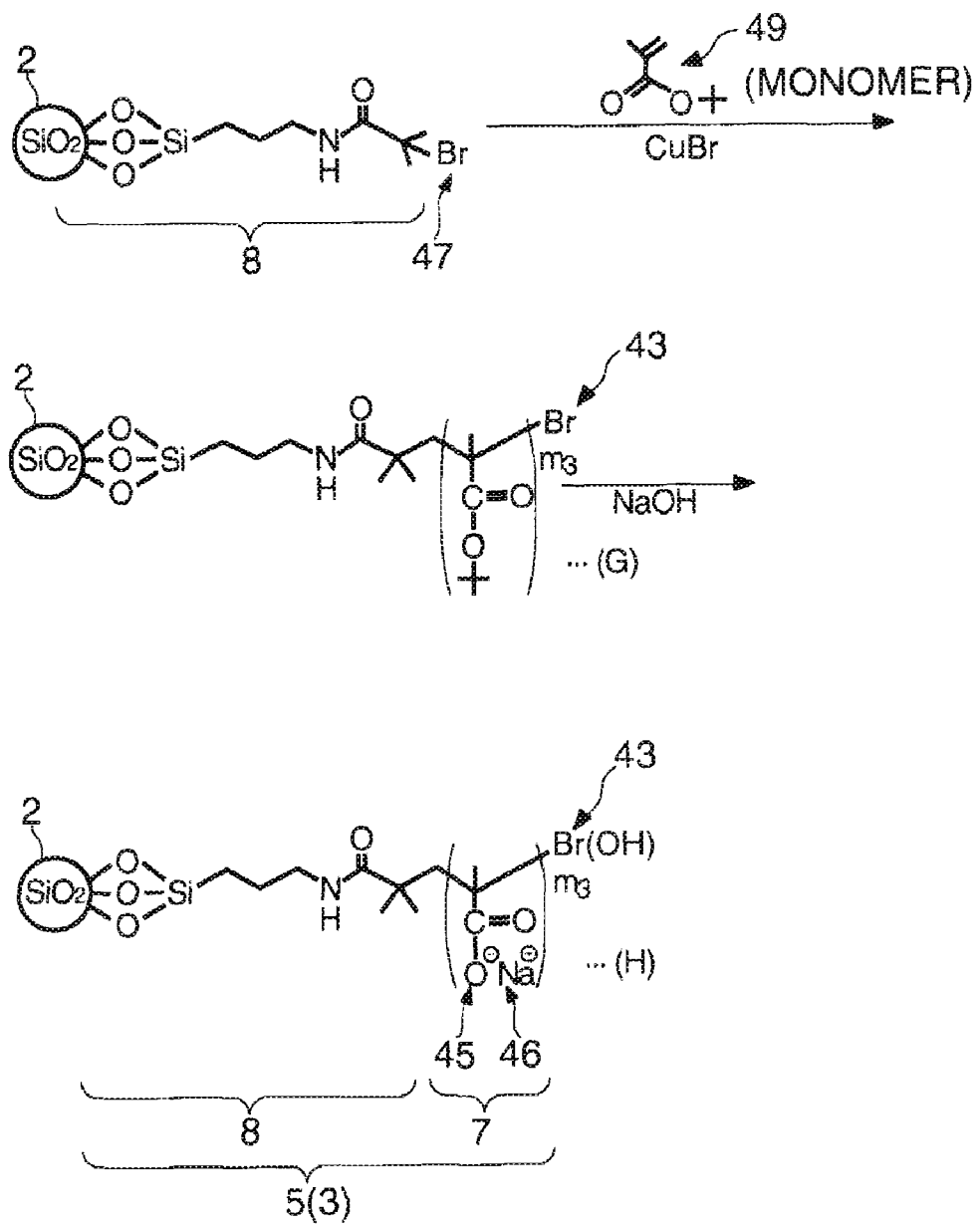
FIG. 11 is a schematic diagram for explaining a manufacturing method of the charged particle shown in FIG. 10.

FIG. 11 is a schematic diagram for explaining a manufacturing method of the charged particle shown in FIG. 10.

1C: Firstly, provide the mother particle 2 (a first step).

2C: Next, form the coating layer 3 on the surface of the mother particle 2 (a second step).

2C-1: The chemical compound (the coupling part 8) having the polymerization initiation group 47 is firstly bonded to the surface of the mother particle 2. This can be carried out in the same way as the above-described step 2A-1.

2C-2: The charged part 7 is then formed in the coupling part 8 having the polymerization initiation group 47 and at the side opposite to the mother particle 2. In this way, the polymer 5 is obtained (synthesized).

The charged part 7 is formed in the following way: A monomer having a functional group which can be converted into the anionic group 45 or a functional group which can become the anionic group 45 by bonding other chemical compounds (all of these groups are hereinafter called "anionic precursor group 49") is polymerized through the living polymerization (particularly atom transfer radical polymerization or ATRP) which starts at the polymerization initiation group 47. In this way, the polymer having the anionic precursor group 49 at its side chain ramified from the main chain is synthesized. Subsequently, the anionic precursor group 49 is turned to the anionic group 45 and the charged part 7 is formed.

Firstly, the monomer having the anionic precursor group 49 is provided. As the monomer having the anionic precursor group 49, for example, various hydrolyzable groups can be used. However, ones including an alkoxy group such as an alkoxycarbonyl group, an alkoxy group and an alkoxysilyl are preferable. Especially the alkoxycarbonyl group is preferable. Such anionic precursor group 49 can be easily turned to the anionic group 45.

It is also preferred that monomer which has the styryl group or the (meta-) acryloyl group be used for the same reasons as those described in the first embodiment. A specific example of such monomer is given by the hereunder chemical formula 7.

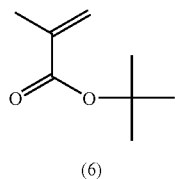

[Chemical Formula 7]

(6)

The polymerization reaction occurs between the polymerization initiation group 47 and the polymerization group of the monomer when the surface of the mother particle 2 to which the coupling part 8 having the polymerization initiation group 47 is bonded is contacted with this solution of the monomer and the catalysis. The propagation site always turns to the polymerization initiation group 43 during the propagation process of the polymer 5, and a polymerization reaction is further taken place between the polymerization initiation group 43 and the polymerization group of the monomer. In this way, the polymer is synthesized (produced).

A polymer having the polymerization initiation group 43 at the end opposite to the mother particle 2 as shown by the formula G in FIG. 11 is formed when for example the chemical compound of the chemical formula 7 is employed as the monomer and CuBr as the catalyst.

The solvent for preparing the solution, deoxidation process, a type of the catalyst, conditions of the polymerization reaction and the like can be same as those of the first embodiment. More specifically, a reaction container equipped with a condenser pipe, an argon gas feeding measure and a stirring blade is provided. A methanol solution of the monomer of the chemical formula 7 is prepared in this reaction container, and CuBr (catalyst) and 2,2-bipyridyl which is going to be a ligand of the catalyst are then added to the methanol solution. The mother particle 2 to which the coupling part 8 having the polymerization initiation group 47 is bonded is immersed in the solution and oxygen is then removed by supplying an argon gas to the solution. The solution thereafter is stirred for about 20 hours at the temperature of 40-60° C. under an argon atmosphere.

Next, the anionic precursor group 49 is converted into the anionic group 45. In this embodiment, the anionic precursor group 49 is (saponified) turned into a salt composed of the anionic group 45 and the conjugated cation 46. This can be done by for example contacting the surface of the mother particle 2 to which the polymer is coupled with a solution containing a chemical compound which can convert the anionic precursor group 49 into the salt (the anionic group 45).

As such chemical compound that can convert the anionic precursor group 49 into the salt, there are for example alkaline chemical compounds such as sodium hydroxide and potassium hydroxide.

As a solvent for preparing this solution, the same solvent used to prepare the above-mentioned monomer solution can be used.

By using for example t-butylester ester methacrylate as the chemical compound that can convert the anionic precursor group 49 to the salt, the polymer 5 having the anionic group 45 of the formula H shown in FIG. 11 can be obtained.

It is note that at least a part of the polymerization initiation group 43 situated at the terminal of the polymer 5 may be converted to a hydroxyl group depending on the condition of the saponification (alkaline hydrolysis).

Electrophoretic Device

An electrophoretic device adopting an electrophoretic sheet of the invention (an electrophoretic device of the invention) will be now described.

Figure 12:
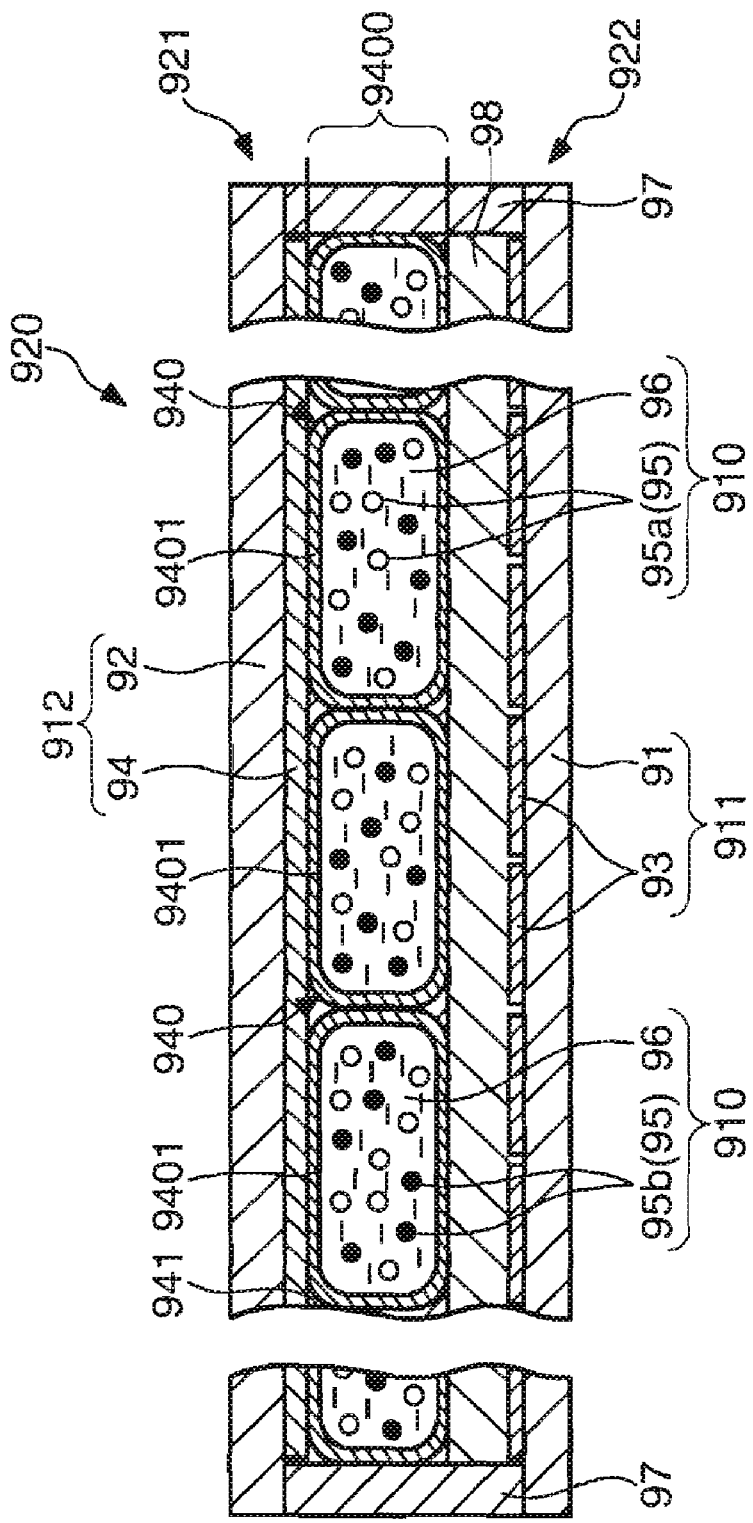
FIG. 12 is a longitudinal sectional view schematically showing an embodiment of an electrophoretic display device.

FIG. 12 is a longitudinal sectional view schematically showing an embodiment of an electrophoretic display device. FIG. 13 schematically shows an operation mechanism of the electrophoretic display device shown in FIG. 12. In the hereinafter description, the upper side and the lower side in FIG. 12 and FIG. 13 is respectively described as "upside" and "lower side".

An electrophoretic device 920 shown in FIG. 12 has an electrophoretic sheet 921 (a front plane), a circuit substrate 922 (a back plane), an adhesive layer 98 that bonds the electrophoretic sheet 921 and the circuit substrate 922, and a sealing member 97 that airtightly seals the gap between the electrophoretic sheet 921 and the circuit substrate 922.

The electrophoretic sheet 921 (the electrophoretic sheet of the invention) includes a substrate 912 having a flat base part 92 and a second electrode 94 provided under the base part 92, and a microcapsule containing layer 9400 including a microcapsule 940 and a binder 941.

The circuit substrate 922 includes an opposing substrate 911 and a circuit (not shown in the figure) including for example a switching element such as a thin film transistor (TFT) provided on the opposing substrate 911 (a flat base part 91). The opposing substrate 911 includes the flat base part 91 and a first electrode 93 which is provided in the plural number on the upper face of the flat base part 91.

Structure of each component will be hereinafter described.

The flat base part 91 and the flat base part 92 are made of a sheet-like (plate-like) member and they support and protect the components placed therebetween. The flat base part 91 and the flat base part 92 can be either flexible or solid. However, it is proffered that the flat base part 91 and the flat base part 92 are made flexible so that the flexible electrophoretic device 920 which can be used for an electronic paper for instance can be obtained. In case of the flexible base parts (base layers) 91, 92, it is preferable that they are made of resin material.

Average thicknesses of the flexible base parts 91, 92 can be set according to the constituent material and their applications and are not especially limited. However, the preferable average thicknesses will be about 20-500 µm, more preferably about 25-250 µm.

On the faces of the base parts 91, 92 that face the microcapsule 940, in other words, on the upper face of the base part 91 and on the bottom face of the base part 92, the first electrode 93 and the second electrode 94 which respectively have a layer form (a film form) are correspondingly provided.

When a voltage is applied between the first electrode 93 and the second electrode 94, an electric field is formed between these electrodes and this affects an electrophoretic particle 95 (the charged particle of the invention).

In this embodiment, the second electrode 94 is a common electrode and the first electrodes 93 are individual electrodes (a pixel electrode coupled to the switching element) which are arranged in matrix. A pixel is formed at a place where the second electrode 94 overlaps one of the first electrodes 93. The electrodes 93, 94 can be made of any material which substantially has conductivity.

Average thicknesses of the electrodes 93, 94 are set according to the constituent material and their applications and are not especially limited. However, the preferable average thicknesses will be about 0.05-10 μm, more preferably about 0.05-5 μm. The base part and the electrode that are situated on the display side (the base part 92 and the second electrode 94 in this embodiment) among the base parts 91, 92 and the electrodes 93, 94 are made light-transmissive or substantially transparent (clear and colorless, colored and transparent, or translucent).

On the electrophoretic sheet 921, the microcapsule containing layer 9400 is provided on the lower face of the second electrode 94. In the microcapsule containing layer 9400, the microcapsule 940 that is a capsule body (a shell) 9401 in which an electrophoretic dispersion liquid 910 (an electrophoretic dispersion liquid of the invention) is enclosed and provided in the plural number is fixed (retained) by the binder 941. The microcapsules 940 are arranged vertically and horizontally in lines in a single layer (not in layers in the thickness direction) between the opposing substrate 911 and the substrate 912.

In this embodiment, the microcapsules 940 are sandwiched by the second electrode 94 and the adhesive layer 98, and they are compressed in the vertical direction, spread in the horizontal direction and flattened in shape. In other words, the microcapsules 940 shows a stone-wall structure when it is viewed in plan.

With such structure, the electrophoretic device 920 can have an increased effective display area and a fine contrast property. Moreover, the travel distance of the electrophoretic particle 95 in the vertical direction can be shortened so that the electrophoretic particle 95 can be moved and reach around the electrode in a short period of time. This improves a response speed.

The capsule body (the shell) 9401 can be made of for example gelatin, a composite material of gelatin and gum arabic, an urethane based resin, a melamine based resin, an urea based resin, polyamide, polyether, and other resin materials. Such material alone or in combinations of two or more types can be used.

The electrophoretic dispersion liquid 910 encapsulated in the capsule body 9401 includes at least one type of the electrophoretic particle 95 (two types in this embodiment: a colored particle 95*b* and a white particle 95*a*) which is dispersed (suspended) in a liquid dispersion medium 96.

The electrophoretic particles 95 can be dispersed in the liquid dispersion medium 96 by for example a paint shaker method, a ball mill method, a media mill method, an ultrasonic dispersion method, a stirring dispersion method or any combination there of.

The liquid dispersion medium 96 is a medium that has a low solubility with respect to the capsule body 9401 and a relatively high insulation property. As such medium, there are for example various water, alcohols, cellosolves, esters, aliphatic hydrocarbons (liquid paraffin), alicyclic hydrocarbons, aromatic hydrocarbons, halogenated hydrocarbons, aromatic heterocycles and the like.

Various additives may be added to the liquid dispersion medium 96 (the electrophoretic dispersion liquid 910) as required. For example, charge controlling agents of particles made of electrolytes, (anionic or cationic) surfactants, metal soaps, resins, rubbers, oils, varnish, compound and the like; dispersants such as a titanium based coupling agent, an aluminum based coupling agent and a silane based coupling agent; lubricants; stabilizers; various dyes and the like may be added.

The electrophoretic particle 95 carries electric charge and is affected by an electric field. In this embodiment, the above-described charged particle 1 is used as the electrophoretic particle 95.

As described above, according to the embodiment of the invention, it is possible to accurately control the amount of electric charge of the charged particle 1 through its manufacturing process. It is also possible to prevent the variation in the amount of the electric charge from occurring by each particle. Moreover, a large amount of electric charge can be imparted to the charged particle 1 so that the particle becomes highly sensitive to an electric field.

Accordingly, where such charged particle 1 is employed as the electrophoretic particle 95, it is possible to move the electrophoretic particle 95 promptly and securely even when an electric field is relatively small. This leads to a low power consumption of the electrophoretic device 920. Furthermore, the electrophoretic particles 95 can be uniformly migrated so that reliability (display quality) of the electrophoretic device 920 can be improved.

An average particle size of the electrophoretic particle 95 is preferably about 0.1-10 μm, more preferably about 0.1-7.5 μm. By setting the average particle size of the electrophoretic particle 95 to such range, it is possible to securely prevent aggregation of the electrophoretic particles 95 and precipitation of the electrophoretic particles 95 in the liquid dispersion medium 96. Consequently, deterioration of the display quality of the electrophoretic device 920 can be appropriately prevented.

Figure 13A:
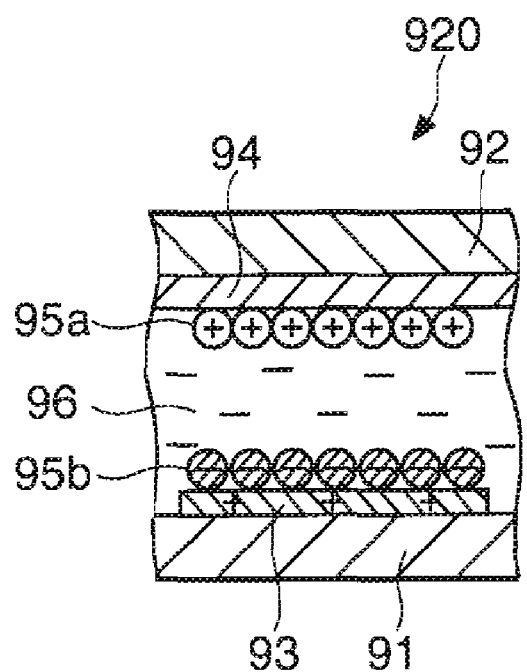
FIG. 13 schematically shows an operation mechanism of the electrophoretic display device shown in FIG. 12.

When a voltage is applied between the first electrode 93 and the second electrode 94 of the electrophoretic device 920, the electrophoretic particles 95 (the colored particle 95*b* and the white particle 95*a*) migrate toward either one of the electrodes depending on a generated electric field.

Where the white particle 95*a* is positively charged, the colored particle 95*b* (black particle) is negatively charged and the first electrode 93 has a positive electric potential, the white particles 95*a* are attracted to the second electrode 94 and aggregate there as shown in FIG. 13A. On the other hand, the colored particles 95*b* are attracted to the first electrode 93 and aggregate there. Thereby, the color of the white particles 95*a* which is white can be seen when the electrophoretic device 920 is viewed from the upper side (the display screen side).

Figure 13B:
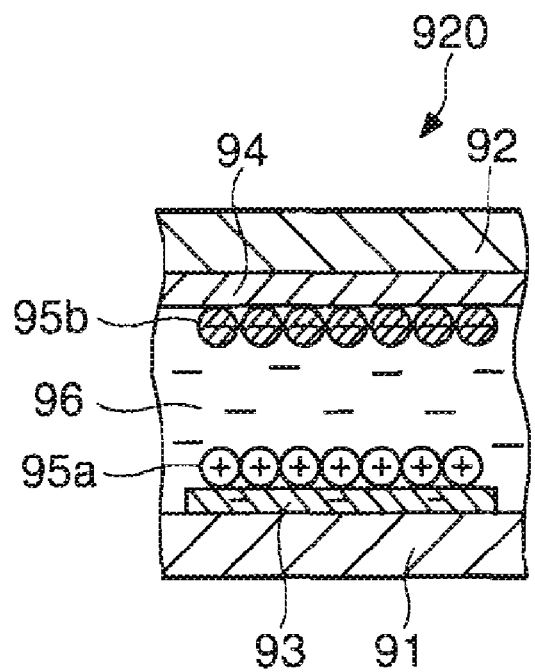

On the contrary, where the first electrode 93 has a negative electric potential, the white particles 95*a* are attracted to the first electrode 93 and aggregate there as shown in FIG. 13B, whereas the colored particles 95*b* are attracted to the second electrode 94 and aggregate there. Thereby, the color of the colored particles 95*b* which is black can be seen when the electrophoretic device 920 is viewed from the upper side (the display screen side).

The amount of the electric charge of the electrophoretic particle 95 (the colored particle 95*b* and the white particle 95*a*), the polarity of the electrodes 93, 94, the electric potential between the electrodes 93, 94 and the like are appropriately adjusted. Though the above-mentioned mechanism, a desired information (image) can be displayed on the display side of the electrophoretic device 920 according to a distributional color combination of the colored particle 95*b* and the white particle 95*a*, the number of the particles aggregating at the electrodes 93, 94 and the like.

It is preferred that a specific gravity of the electrophoretic particle 95 is adjusted so as to be substantially same as a specific gravity of the liquid dispersion medium 96. In this way, the electrophoretic particles 95 can stay at one position in the liquid dispersion medium 96 for a long time even after the voltage application between the electrodes 93, 94 has stopped. It follows that the displayed information can be retained for the long time in the electrophoretic device 920.

As a method of forming the microcapsule 940, for example, an interfacial polymerization method, an in-situ polymerization method, a phase separation method (or a coacervation method), an interfacial precipitation method, a spray-drying method, and other micro-capsulation method can be used. The microcasulation method will be adequately selected according to the constituent material and the like of the microcapsule 940.

An average size of the microcapsule 940 is preferably about 5-50 μm, more preferably about 10-30 μm.

The binder 941 is mainly for fixing (holding the position of the microcapsule 940) the microcapsule 940. The binder 941 can be made of various bonds and adhesives. Where the binder 941 is made of an adhesive, the binder 941 can also serve as the hereinafter described adhesive layer 98.

It is preferred that the permittivity of the binder 941 be substantially same as the permittivity of the liquid dispersion medium 96. In this case, a permittivity adjuster such as alcohols including 1,2-butanediol and 1,4-butanediol, ketone series, carboxylates and the like may be added into the binder 941.

In this embodiment, the electrophoretic sheet 921 is jointed with the circuit substrate 922 through the adhesive layer 98. Thereby, the electrophoretic sheet 921 is securely adhered and fixed with the circuit substrate 922.

An average thickness of the adhesive layer 98 is not particularly limited. However, about 1-30 μm is desirable, more preferably about 5-20 μm.

The sealing member 97 is provided between the base part 91 and the base part 92 and along the peripheral of the base parts. The sealing member 97 airtightly encloses the electrodes 93, 94, the microcapsule containing layer 9400 and the adhesive layer 98. Thereby, it is possible to prevent a liquid from entering into the electrophoretic device 920 and this helps to avoid the deterioration in the display quality of the electrophoretic device 920. The sealing member 97 can be made of for example various resins including thermoplastic resins such as a acrylate based resin, an urethane based resin and an olefin based resin, and thermosetting resins such as an epoxy based resin, a melamine based rein and a phenol based resin; or any combination thereof.

Electronic Equipment

Next, electronic equipment of the invention will be described. The electronic equipment according to an embodiment of the invention has the above described electrophoretic device 920.

Electronic Paper

Figure 14:
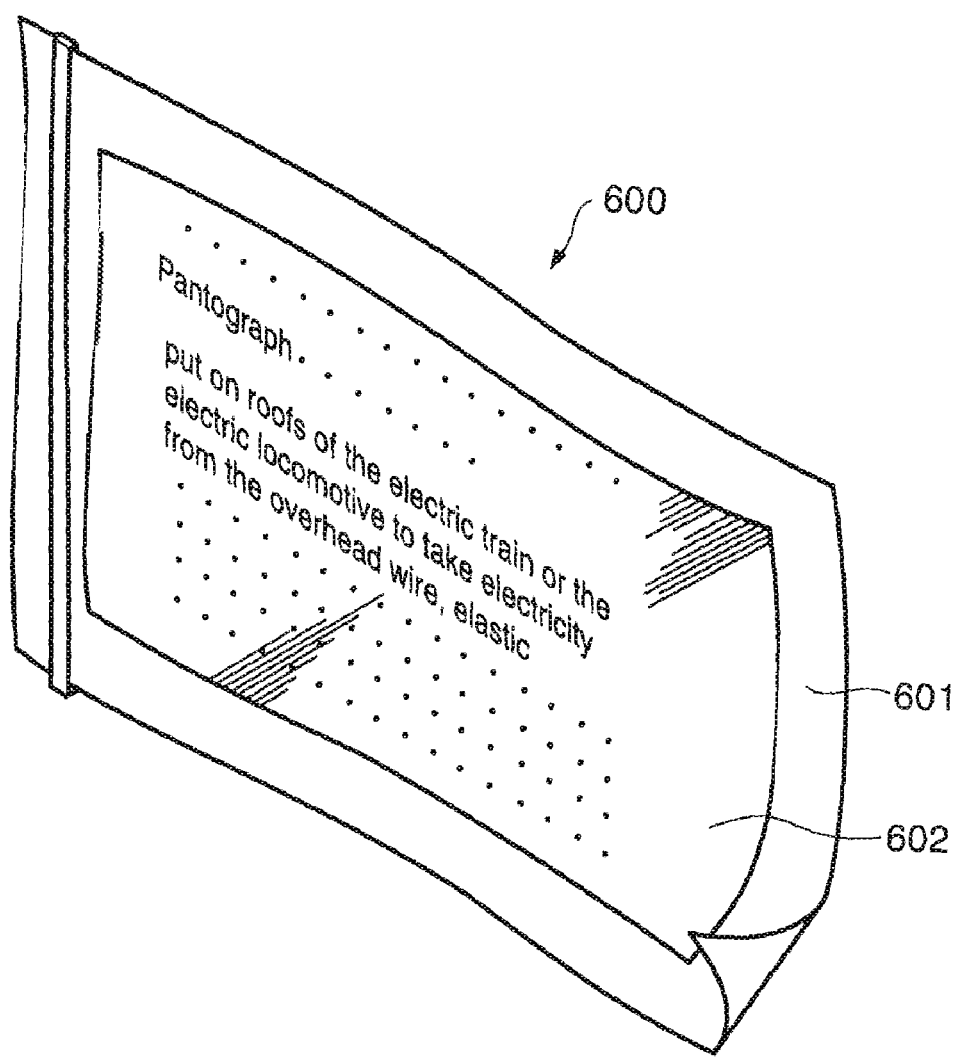
FIG. 14 is a perspective view of an electronic paper as an embodiment of electronic equipment of the invention.

First of all, an embodiment in which the electronic equipment of the invention is applied to an electronic paper is described. FIG. 14 is a perspective view of the electronic paper as an embodiment of electronic equipment of the invention.

The electronic paper 600 shown in FIG. 14 has a main body 601 made of a sheet which is rewritable and has a texture like a paper and flexibility, and a display unit 602. In this electronic paper 600, the above described electrophoretic device 920 is adopted as the display unit 602.

Display

Figure 15A:
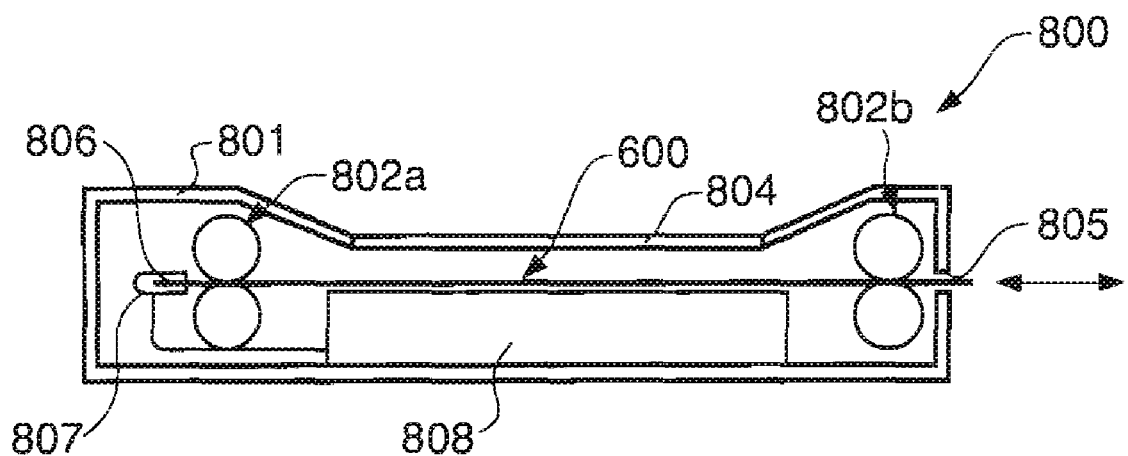
FIG. 15 is a perspective view of a display device as an embodiment of electronic equipment of the invention.
Figure 15B:
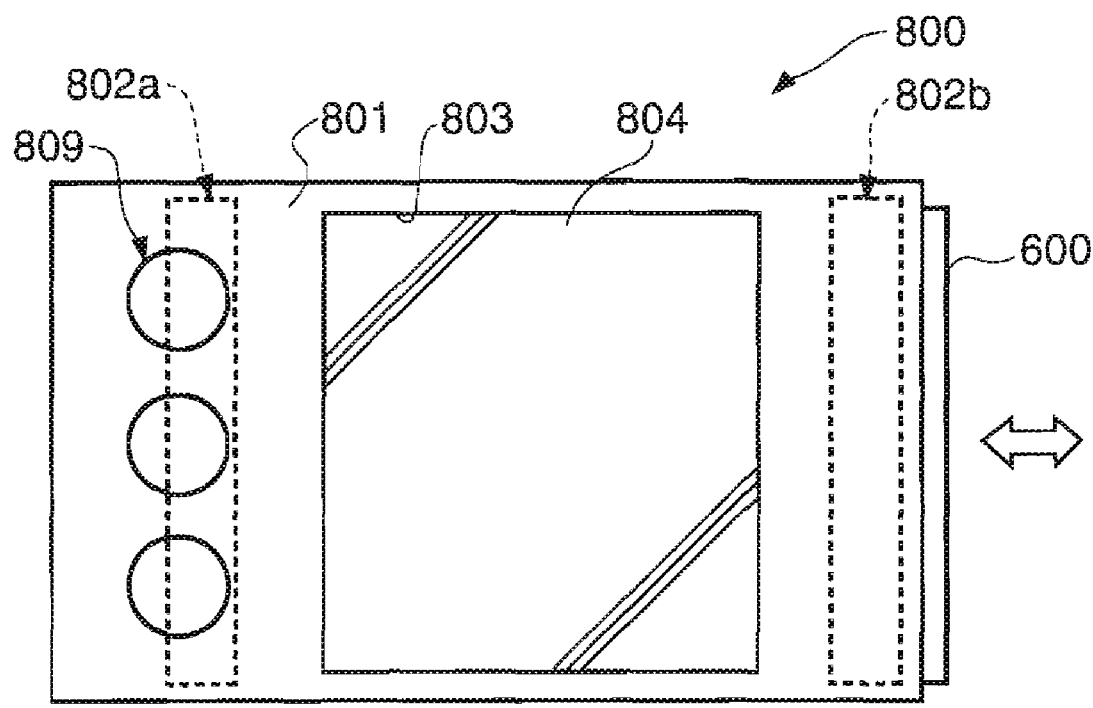

Next, an embodiment in which the electronic equipment of the invention is applied to a display is described. FIG. 15 is a perspective view of a display device as the embodiment of electronic equipment of the invention. FIG. 15A is a sectional view and FIG. 15B is a plan view.

A display 800 (a display device) shown in FIG. 15 has a main body 801 and the electronic paper 600 which is detachable from the main body 801.

The main body 801 has an insertion slot 805 through which the electronic paper 600 can be inserted therein on its side (the right side in FIG. 15A). The main body 801 also has a pair of rollers 802*a* and another pair of rollers 802*b* inside. After the electronic paper 600 is inserted into the main body 801 through the insertion slot 805, the electronic paper 600 is placed in the main body 801 such that it is supported by the pair of rollers 802*a* and the pair of rollers 802*b*.

A square shape opening 803 is formed on the display screen side (the front side in the page of FIG. 15) of the main body 801 and the opening 803 is embedded with a transparent glass substrate 804. Thereby, the electronic paper 600 installed in the main body 801 can be seen with eyes from the outside of the main body 801. In other words, the display 800 has the display screen of the electronic paper 600 installed in the main body 801 that can be seen through the transparent glass substrate 804.

A terminal 806 is provided at the end of the insertion direction of the electronic paper 600 (the left side in FIG. 15). A socket 807 is further provided in the main body 801. The terminal 806 is coupled to the socket 807 as the electronic paper 600 is installed in the main body 801. A controller 808 and an operation part 809 are electrically coupled to the socket 807. In such display 800, the electronic paper 600 is provided detachable from the main body 801 and it can be used portable as being detached from the main body 801. In this display 800, the above described electrophoretic device 920 is adopted as the electronic paper 600.

Application of the electronic equipment of the invention is not limited to the above-mentioned examples. There is for example television, a view finder type or direct view type video tape recorder, a car navigation device, a pager, an electronic databook, a calculator, an electronic newspaper, a word processor, a personal computer, a work station, a videophone, a point-of-sale terminal, equipments having a touch panel and the like. The electrophoretic device 920 of the invention can be applied to a display part of the electronic equipment.

The method of manufacturing electrically charged particles, the electrically charged particle, the electrophoretic dispersion liquid, the electrophoretic sheet, the electrophoretic device and the electronic equipment of the invention have been described as embodiments with reference to the accompanying drawings. The invention is obviously not limited to the specific embodiments described herein, but also encompasses any variations that may be considered by any person skilled in the art, within the general scope of the invention. For example, the structures or the components in the embodiments can be replaced other structures or components that have the same functions, and any structure may be added to the embodiments as required. By the same token, one or more steps for other purpose may be added to the method of manufacturing a charged particle of the invention. Moreover, the charged particle of the invention may be formed by combing any features of the above described first-third embodiments. Furthermore, the charged particle of the invention can be applied to other use than the electrophoretic particle, for example to toner and the like.

What is claimed is:

1. A charged particle, comprising:
   a mother particle; and
   a coating layer covering at least a part of the mother particle,
   the coating layer including a polymer, and
   the polymer including a first chemical compound that couples to a surface of the mother particle and a second chemical compound that reacts through a living polymerization that starts from a starting point of the first chemical compound,
   wherein the polymer has cationic groups at its side chains, which are ramified from its main chain.

2. Electrophoretic dispersion liquid, comprising:
   a liquid; and
   the charged particle according to claim 1 dispersed in the liquid and the charged particle migrating where an electric field is applied.

3. An electrophoretic sheet, comprising:
   a substrate; and
   a plurality of structures that enclose the electrophoretic dispersion liquid according to claim 2.

4. An electrophoretic device, comprising the electrophoretic sheet according to claim 3.

5. Electronic equipment, comprising the electrophoretic device according to claim 4.

6. The charged particle according to claim 1, wherein first chemical compound is coupled to the surface of the mother particle via an ionic bond.

7. The charged particle according to claim 1, wherein first chemical compound is coupled to the surface of the mother particle via an covalent bond.

8. The charged particle according to claim 1, wherein the polymer has more than 300 of the cationic groups.

9. The charged particle according to claim 1, wherein the polymer has more than 600 of the cationic groups.

10. The charged particle according to claim 1, wherein the cationic groups are selected from the group consisting of ammonium groups having a hydrogen atom or an alkyl group on the nitrogen atom, iminium groups having a hydrogen atom or an alkyl group on the nitrogen atom, pyridinium groups having a hydrogen atom or an alkyl group on the nitrogen atom, and ocenium groups.

* * * * *